United States Patent
Zhang et al.

(10) Patent No.: US 12,448,536 B2
(45) Date of Patent: Oct. 21, 2025

(54) NANO METAL PASTE, AND PREPARATION AND APPLICATION THEREOF

(71) Applicant: Guangdong University of Technology, Guangzhou (CN)

(72) Inventors: Yu Zhang, Guangzhou (CN); Kai Yang, Guangzhou (CN); Guannan Yang, Guangzhou (CN); Chengqiang Cui, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/543,147

(22) Filed: Dec. 18, 2023

(65) Prior Publication Data
US 2024/0117209 A1    Apr. 11, 2024

(30) Foreign Application Priority Data
May 23, 2023    (CN) .......................... 202310581333.7

(51) Int. Cl.
  C09D 11/52    (2014.01)
  C09D 17/00    (2006.01)
(52) U.S. Cl.
  CPC ............ *C09D 11/52* (2013.01); *C09D 17/006* (2013.01)

(58) Field of Classification Search
  CPC ....................................................... C09D 11/52
  See application file for complete search history.

(56) References Cited

U.S. PATENT DOCUMENTS

| | | | | |
|---|---|---|---|---|
| 2010/0120960 | A1* | 5/2010 | Lee | B82Y 40/00 524/403 |
| 2010/0303876 | A1* | 12/2010 | Klein | B22F 9/24 252/514 |
| 2011/0253949 | A1* | 10/2011 | Kaneda | C09D 17/006 977/773 |
| 2019/0164661 | A1* | 5/2019 | Song | C08L 39/06 |
| 2021/0253885 | A1* | 8/2021 | Yoshida | C09D 11/326 |

* cited by examiner

*Primary Examiner* — William D Young

(57) ABSTRACT

A method for preparing a nano metal paste, including the following steps. (S1) An organic metallic salt and an organic reducing agent are added into water or an organic solvent to obtain a first mixture. (S2) The first mixture is reacted under heating to obtain a second mixture containing metal nanoparticles. (S3) The second mixture is concentrated to obtain a nano metal paste containing 20-95% by weight of the metal nanoparticles. A conductive paste and A conductive ink prepared by using the nano metal paste as filler are also provided.

7 Claims, 3 Drawing Sheets

NANO METAL PASTE, AND PREPARATION AND APPLICATION THEREOF

CROSS-REFERENCE TO RELATED APPLICATIONS

This application claims the benefit of priority from Chinese Patent Application No. 202310581333.7, filed on May 23, 2023. The content of the aforementioned application, including any intervening amendments thereto, is incorporated herein by reference in its entirety.

TECHNICAL FIELD

The present disclosure relates to conductive nanomaterials, and more particularly to a nano metal paste, and a preparation and application thereof.

BACKGROUND

Conductive pastes have been widely used in the fields of communications, circuits, aerospace and photovoltaic new energy. The conductive paste is formed by adding conductive fillers to a resin binder followed by curing or sintering. The conductive paste is well recognized as the foundation for development of electronic components, and also plays a key role in the electronic packaging, interconnection and battery electrode preparation. With the rapid development of the information industry, electronic devices have become increasingly miniaturized, precise and flexible, and higher requirements have been raised for conductive pastes. As another available conductive material, conductive ink is formed by dispersing a conductive filler in a solvent, and is used for printing conductive patterns, which are sintered to form conductive circuits. The resultant conductive circuits have been widely used in fields of communications, circuit, aerospace and photovoltaic energy.

Both the conductive paste and the conductive ink contain conductive fillers to achieve the conductive effect. Currently, the commonly-used conductive fillers are conductive nanoparticles, which are dispersed in the resin binder or solvent in a powder form. Because of the large surface area, high activity, and easy agglomeration, conductive nanoparticles are prone to oxidation, and have large dispersion difficulty when dispersing in the resin binder or solvent, thereby affecting the conductive properties of the final products.

In addition, the conductive paste (i.e., metal paste) has a complicated preparation, referring to FIG. 1. Specifically, a metal salt and a reducing agent are reacted in a solvent to obtain a metal particle dispersion, which is centrifuged and washed several times, and dried to obtain metal nanoparticles. It is further required to grind and disperse the metal nanoparticles in a solvent prior to dispersion in the resin. In the prior art, the preparation of metal nanoparticles often involves inorganic metal salts, inorganic reducing agents and inorganic solvents, while the conductive pastes and conductive inks are organic systems. In this regard, the metal nanoparticles need to be repeatedly washed to prevent inorganic materials from being mixed into the organic system of the conductive paste and the conductive ink, and to ensure the conductivity of the organic system and the structural reliability of the cured organic system. Moreover, the steps of purification, drying, storage and re-dispersion will greatly exacerbate the particle aggregation.

It can be concluded that the existing preparation of conductive pastes or conductive inks involving the step of dispersing the conductive nanoparticles in a resin binder or solvent in a powder form has complex operation, and moreover, the prepared conductive paste and conductive ink have poor conductive performance due to the easy oxidation and agglomeration of the metal nanoparticles.

SUMMARY

A first object of the present disclosure is to provide a method for preparing a nano metal paste, which has simple operation and good dispersion of metal nanoparticles.

A second object of the present disclosure is to provide a nano metal paste, in which the metal nanoparticles have a good dispersion and are less likely to be oxidized. The nano metal paste has simple storage conditions, and can be applied to conductive pastes and conductive inks with various solid contents.

A third object of the present disclosure is to provide a method for preparing a conductive paste, in which a nano metal paste is directly mixed with other ingredients to obtain the conductive paste. The preparation has simple operation, and the metal nanoparticles are well dispersed and not easily oxidized, which ensures a good conductivity of the conductive paste.

A fourth object of the present disclosure is to provide a method for preparing a conductive ink, in which the nano metal paste is directly mixed with other ingredients to obtain the conductive ink. The preparation has simple operation, and the metal nanoparticles are well dispersed and not easily oxidized, which ensures a good conductivity of the conductive ink.

The technical solutions adopted herein are described as follows.

In a first aspect, this application provides a method for preparing a nano metal paste, comprising:
  (S1) adding an organic metallic salt and an organic reducing agent to a solvent to obtain a first mixture, wherein the solvent is water, an organic solvent or a combination thereof;
  (S2) reacting the first mixture under heating to obtain a second mixture containing metal nanoparticles; and
  (S3) concentrating the second mixture to obtain the nano metal paste, wherein a weight percentage of the metal nanoparticles in the nano metal paste is 20-95%.

In an embodiment, in the step (S2), the first mixture is reacted at 20-180° C. for 1-60 min.

In an embodiment, in the step (S3), the second mixture is concentrated by centrifugation at 3000-15000 rpm for 1-10 min.

In an embodiment, the organic reducing agent is selected from the group consisting of ascorbic acid, glucose, hydrazine hydrate, pyrocatechin, acetaldehyde, aniline, and a combination thereof.

In an embodiment, in the step (S1), the solvent is selected from the group consisting of deionized water, ethanol, ethylene glycol, diglycol, dipropylene glycol (DPG), glycerine, terpilenol, and a combination thereof.

In an embodiment, in the step (S2), the metal nanoparticles are selected from the group consisting of silver nanoparticles, gold nanoparticles, nickel nanoparticles, palladium nanoparticles, tungsten nanoparticles, cobalt nanoparticles and platinum nanoparticles.

In an embodiment, when the metal nanoparticles are silver nanoparticles, the organic metallic salt is selected from the group consisting of silver formate, silver acetate, silver acetylacetonate, silver benzoate, silver stearate and a combination thereof;

when the metal nanoparticles are gold nanoparticles, the organic metallic salt is selected from the group consisting of gold acetate, gold acetylacetonate and a combination thereof;

when the metal nanoparticles are nickel nanoparticles, the organic metallic salt is selected from the group consisting of nickel formate, nickel acetate, nickel acetylacetonate, nickel benzoate, nickel stearate and a combination thereof;

when the metal nanoparticles are palladium nanoparticles, the organic metallic salt is selected from the group consisting of palladium formate, palladium acetylacetonate, palladium benzoate, palladium acetate and a combination thereof;

when the metal nanoparticles are tungsten nanoparticles, the organic metallic salt is selected from the group consisting of tungsten acetate, tungsten acetylacetonate and a combination thereof;

when the metal nanoparticles are cobalt nanoparticles, the organic metallic salt is selected from the group consisting of cobalt formate, cobalt acetate, cobalt acetylacetonate, cobalt benzoate, cobalt stearate and a combination thereof; and when the metal nanoparticles are platinum nanoparticles, the organic metallic salt is selected from the group consisting of platinum acetate, platinum acetylacetonate, platinum benzoate, platinum stearate and a combination thereof.

A nano metal paste, which is prepared by the aforementioned method.

A conductive paste is prepared by the steps of:
(S1) preparing a nano metal paste by using the aforementioned method; and
(S2) mixing the nano metal paste with a resin and a cuing agent uniformly to obtain the conductive paste;
wherein the nano metal paste accounts for 50-80% of a total weight of the conductive paste raw material.

A conductive ink is prepared by the steps of:
(S1) preparing a nano metal paste by using the aforementioned method; and
(S2) mixing the nano metal paste with an ink solvent and uniformly to obtain the conductive ink;
the nano metal paste accounts for 50-70% of a total weight of the conductive ink raw material.

The technical solutions of the present disclosure have the following benefits.

The present disclosure provides a method for preparing a nano metal paste. The nano metal paste can be directly applied as a filler in conductive pastes and conductive inks. In the method for preparing the nano metal paste of the present disclosure, the organic metallic salts and the organic reducing agent are used as starting materials, and water or organic solvent is used as solvent for reaction. After reaction, only a concentration step is required to obtain the nano metal paste. The preparation is very simple and easy to manipulate. The metal nanoparticles are directly preserved in the paste to prevent the metal nanoparticles from being directly exposed to the air which effectively ensures that the metal nanoparticles are not oxidized. And the metal nanoparticles have a very good dispersion effect in the paste, which is not easily agglomerated in the storage and use.

The method for preparing conductive paste of the present disclosure directly mixes the nano metal paste with other raw materials to obtain the conductive paste. The preparation of the conductive paste is simple, and the metal nanoparticles are well dispersed and not easily oxidized, which ensures that the conductive paste has good conductive properties.

The method for preparing conductive ink of the present disclosure directly mixes the nano metal paste with other raw materials to obtain the conductive ink. The preparation of the conductive ink is simple, and the metal nanoparticles are well dispersed and not easily oxidized, which ensures that the conductive ink has good conductive properties.

DETAILED DESCRIPTION OF EMBODIMENTS

Figure 1:
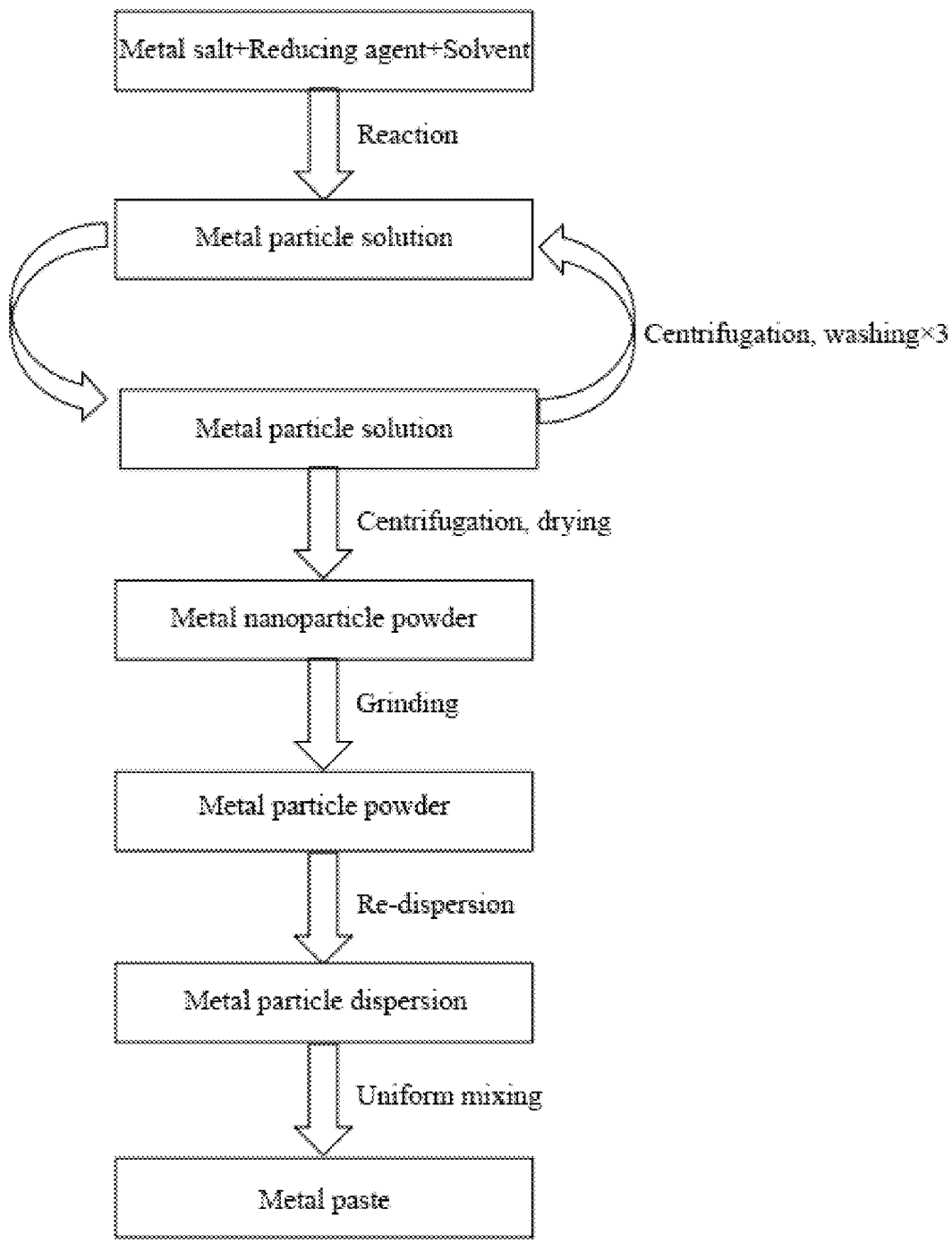
FIG. 1 is a flowchart of a conductive paste preparation process in the prior art.

The present disclosure provides a method for preparing a nano metal paste, including the following steps.

(S1) An organic metallic salt and an organic reducing agent are added into a solvent to obtain a first product. And the solvent is water, an organic solvent or a combination thereof.

(S2) The first mixture is reacted under heating to obtain a second mixture containing metal nanoparticles.

(S3) The second mixture obtained is concentrated to obtain the nano metal paste. And a weight percentage of the metal nanoparticles in the nano metal paste is 20-95%.

With the defects of complicated preparation steps of metal nanoparticles and easy oxidization and agglomeration of metal nanoparticles in the prior art, the present disclosure provides a method for preparing a nano metal paste, which can be directly applied as a filler in conductive pastes and conductive inks. In the method of the present disclosure, the organic metallic salts and the organic reducing agent are used as starting materials, and water or an organic solvent is used as a solvent for reaction. After reaction, only a concentration step is required to obtain the nano metal paste. The preparation is very simple and easy to manipulate. The metal nanoparticles are directly preserved in the paste to prevent the metal nanoparticles from being directly exposed to the air which effectively ensures that the metal nanoparticles are less likely to be oxidized.

Specifically, in the present disclosure, the organic metallic salt is the starting material and after being reduced by the organic reducing agent, the metal cation forms the metal nanoparticles. The metal cations form the metal nanoparticles, and the organic anions form organic matter that is easy to decompose. In the reaction process or subsequent application in the conductive paste and conductive ink, the organic matter can be discharged from the system, does not affect the conductivity, service life, viscosity, fluidity and other physical indicators of the conductive paste and conductive ink, to ensure that the conductive ink have excellent performance.

Compared with the prior art, which requires repeated washing as well as drying and grinding and dispersing of the metal nanoparticles obtained from the reaction, in the present disclosure, it is only necessary to concentrate the mixture obtained from the reaction, which simplifies the preparation of the metal nanoparticles to a large extent, and reduces the production cost. The obtained metal nanoparticles are directly preserved in the paste and have a good dispersion effect. And the drying and grinding steps are omitted, avoiding the possibility of being oxidized during the drying and grinding steps.

Moreover, the nano metal paste prepared by the present disclosure can be directly mixed with other raw materials to make conductive paste or conductive ink without re-dispersion, which effectively avoids the problem of metal particles agglomeration in the preparation of conductive paste or conductive ink, greatly simplifies the preparation process, and is conducive to the large-scale application of nano metal paste production.

In an embodiment, in the step (S2), the first mixture is reacted at 20-180° C. for 1-60 min.

In some embodiments of the present disclosure, heating is employed to promote the generation of metal nanoparticles in the reaction system, and it will be understood that the reaction temperature and the reaction time are determined according to the organic metallic salt, the organic reducing agent, and the solvent.

In an embodiment, in the step (3), the second mixture is concentrated by centrifugation at 3000-15000 rpm for 1-10 min.

In some embodiments of the present disclosure, the second mixture is concentrated by centrifugation, which ensures that the metal nanoparticles well dispersed in nano metal paste and avoids being exposed to air, ensuring that the metal nanoparticles are less likely to be oxidized during the concentration operation. The centrifugation speed and centrifugation time were selected within a limited range based on the different nano metal paste concentration requirements for conductive pastes and conductive inks.

In an embodiment, the organic reducing agent is selected from the group consisting of ascorbic acid, glucose, hydrazine hydrate, pyrocatechin, acetaldehyde, aniline, and a combination thereof. The organic reducing agent has a good reduction reaction effect in the system, and the products of the reaction remain in the nano metal powder paste, which has no effect on the performance of the conductive paste and conductive ink.

In an embodiment, in the step (S1), the solvent is selected from the group consisting of deionized water, ethanol, ethylene glycol, diglycol, dipropylene glycol (DPG), glycerine, terpilenol, and a combination thereof. The above solvent has a good dispersing effect on the organic metallic salt and the organic reducing agent to ensure that the organic metallic salt and the organic reducing agent can fully react, and to ensure the above solvent can be easily removed and has no effect on the performance of the conductive paste and the conductive ink if it remains in the nano metal paste.

In an embodiment, in the step (S2), the metal nanoparticles are selected from the group consisting of silver nanoparticles, gold nanoparticles, nickel nanoparticles, palladium nanoparticles, tungsten nanoparticles, cobalt nanoparticles and platinum nanoparticles. With the preparation method of the present disclosure, nanoparticles of silver, gold, nickel, palladium, tungsten, cobalt and platinum can be easily obtained, and the nano metal pastes have good applications in conductive pastes and conductive inks.

In an embodiment, when the metal nanoparticles are silver nanoparticles, the organic metallic salt is selected from the group consisting of silver formate, silver acetate, silver acetylacetonate, silver benzoate, silver stearate and a combination thereof.

When the metal nanoparticles are gold nanoparticles, the organic metallic salt is selected from the group consisting of gold acetate, gold acetylacetonate and a combination thereof.

When the metal nanoparticles are nickel nanoparticles, the organic metallic salt is selected from the group consisting of nickel formate, nickel acetate, nickel acetylacetonate, nickel benzoate, nickel stearate and a combination thereof.

When the metal nanoparticles are palladium nanoparticles, the organic metallic salt is selected from the group consisting of palladium formate, palladium acetylacetonate, palladium benzoate, palladium acetate and a combination thereof.

When the metal nanoparticles are tungsten nanoparticles, the organic metallic salt is selected from the group consisting of tungsten acetate, tungsten acetylacetonate and a combination thereof.

When the metal nanoparticles are cobalt nanoparticles, the organic metallic salt is selected from the group consisting of cobalt formate, cobalt acetate, cobalt acetylacetonate, cobalt benzoate, cobalt stearate and a combination thereof.

When the metal nanoparticles are platinum nanoparticles, the organic metallic salt is selected from the group consisting of platinum acetate, platinum acetylacetonate, platinum benzoate, platinum stearate and a combination thereof.

The present disclosure is further prepared to limit the organic metallic salts selected for different metal nanoparticles to provide a reference for those skilled in the art to implement the present disclosure.

Accordingly, the present disclosure also provides a nano metal paste which is prepared by using the aforementioned method. The metal nanoparticles in the metal nanoparticles have a weight ratio of 20-95%, which can meet the needs of various conductive pastes and conductive inks. The metal nanoparticles are uniformly dispersed and not agglomerated, and are less likely to be oxidized.

Figure 2:
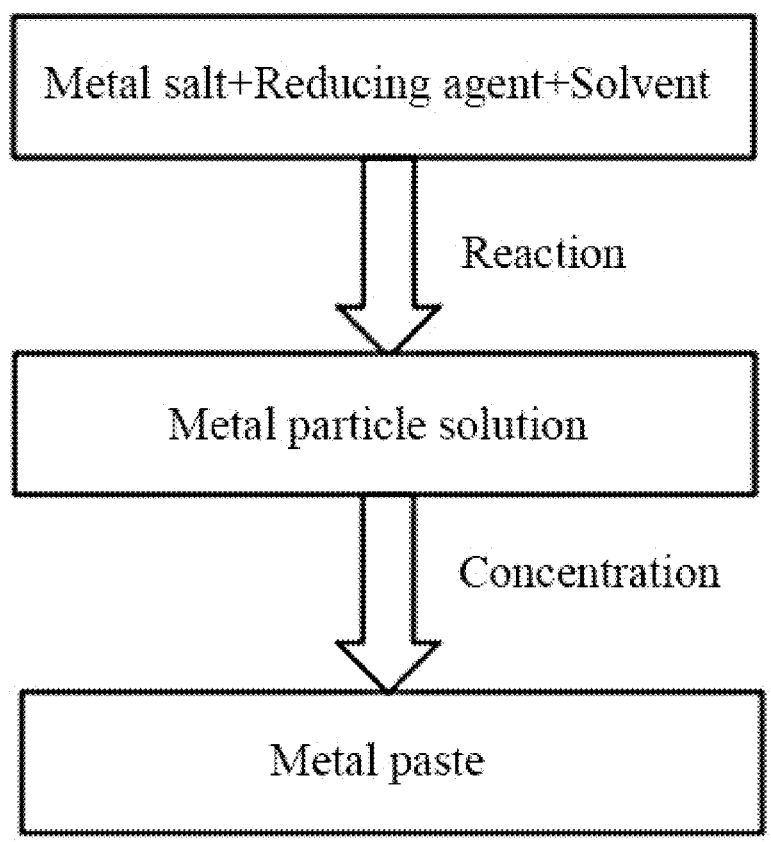
FIG. 2 is a flowchart of a conductive paste preparation process according to an embodiment of the present disclosure.
Figure 3:
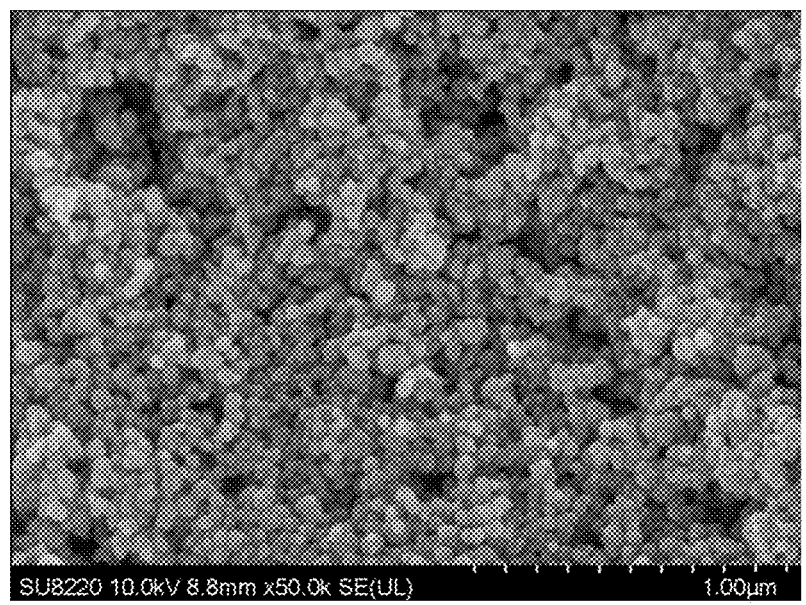
FIG. 3 is an SEM (scanning electron microscope) image of a nano silver paste according to an embodiment of the present disclosure.

With reference to FIG. 2, the present disclosure provides a method for preparing a conductive paste, including the following steps.

(S1) A nano metal paste is prepared by the aforementioned method.

(S2) A resin, a cuing agent and the nano metal paste are mixed evenly to obtain the conductive paste (i.e., metal paste).

The nano metal paste accounts for 50-80% of the total weight of the conductive paste.

In the above method, the preparation of the nano metal paste is simple and convenient, and the prepared nano metal paste can be directly mixed with the resin and the curing agent to prepare the conductive paste without re-dispersion, thereby simplifying the preparation process of the conductive paste and enhancing the reliability.

In the present disclosure, the resin is used as a binder in the preparation of the conductive paste, and has a high chemical stability after curing. The resins and curing agents commonly used in the prior art for conductive pastes are suitable for the present disclosure. In an embodiment, the resin is selected from the group consisting of epoxy resin, acrylic resin, and phenolic resin. Specifically, the epoxy resin is selected from the group consisting of bisphenol A diglycidyl ether resin, bisphenol F epoxy resin, glycidyl amine epoxy resin, aliphatic epoxy resin, aliphatic epoxidized olefin compounds, and heterocyclic glycidyl epoxy resin. The acrylic resins include FEP (Fluorinated ethylene propylene) and styrene-acrylic resins.

The curing agent is an amine curing agent or an anhydride curing agent.

It should be noted that the resin may be diluted with a diluent (e.g., acetone) in the case of high viscosity.

The addition amount of the nano metal paste is determined based on the solid content, the material of the metal nanoparticles, the type of the resin and the curing agent, and the conductive performance requirements of the conductive paste. In an embodiment, the nano metal paste accounts for 50-80% of the total weight of the conductive paste.

The present disclosure also provides a method for preparing a conductive ink, including the following steps.

(S1) A nano metal paste is prepared by the aforementioned method.

(S2) The nano metal paste is mixed with an ink solvent uniformly to obtain the conductive ink.

The nano metal paste accounts for 50-70% of the total weight of the conductive ink.

In the above method, the preparation of the nano metal paste is simple and convenient. The conductive ink can be prepared directly by mixing the nano metal paste with the ink solvent without re-dispersion, thereby simplifying the preparation process of the conductive ink and enhancing the reliability.

The addition amount of the nano metal paste is determined based on the solid content, the material of the metal nanoparticles, the type of the ink solvent, and the conductive In an embodiment, the ink solvent and the nano metal paste are ultrasonically dispersed to prepare a conductive ink.

The present disclosure is further elaborated by examples and comparative examples.

Example 1 Nano Silver Paste, Conductive Paste and Conductive Ink

The nano silver paste was prepared as follows.

(S1) An organic metallic salt and an organic reducing agent were added into a solvent.

(S2) The reaction was carried out under heating to obtain a mixture containing metal nanoparticles.

(S3) The mixture was concentrated to obtain the nano metal paste.

The raw materials, the preparation parameters, and the weight percentage of silver nanoparticles in the nano silver pastes were shown in Table 1.

TABLE 1

Raw materials, preparation parameters and weight percentage of silver nanoparticles in Example 1

| Raw material & parameter | Example 1-1 | Example 1-2 | Example 1-3 | Example 1-4 | Example 1-5 |
|---|---|---|---|---|---|
| Organic metallic salt | silver acetylacetonate | silver benzoate & silver stearate | silver stearate | silver acetate | silver formate |
| Organic reducing agent | ascorbic acid | acetaldehyde | pyrocatechol | aniline | hydrazine hydrate |
| Solvent | terpineol | Ethanol & glycol | diglycol | Dipropylene glycol (DPG) | ethanol |
| Reaction temperature | 20° C. | 40° C. | 100° C. | 180° C. | 60° C. |
| Reaction time | 40 min | 30 min | 10 min | 1 min | 20 min |
| Centrifugation rotation speed | 8,000 rpm | 15,000 rpm | 3,000 rpm | 6,000 rpm | 12,000 rpm |
| Centrifugation time | 5 min | 1 min | 10 min | 2 min | 1 min |
| Weight percentage of silver nanoparticles | 90% | 93% | 85% | 92% | 85% | performance requirements of the conductive ink. In an embodiment, the nano metal paste accounts for 50-70% of the total weight of the conductive ink raw material. It should be noted that the conductive ink is usually added with a relatively small amount of the nano metal paste based on printing needs. In the present disclosure, the metal nanoparticles account for 20-95% of the weight of the nano metal paste. And in order to ensure that the metal nanoparticles have a better dispersion effect in the conductive ink, the metal nanoparticles account for 20-60% of the weight of the nano metal paste, which ensures that the conductive ink has sufficient conductive properties.

The nano silver paste of Example 1-1 was mixed with a resin and a curing agent uniformly to prepare a conductive paste. The conductive paste was applied between two glass sheets and cured to test the resistivity. The composition and resistivity (after cured) of the conductive pastes were shown in Table 2.

TABLE 2

Composition and resistivity of conductive pastes

| | Raw material | Example 1-6 | Example 1-7 | Example 1-8 | Example 1-9 |
|---|---|---|---|---|---|
| Composition (parts by weight) | bisphenol A epoxy resin | 40 | 25 | 15 | 35 |
| | polyamide | 4 | 3 | 5 | 5 |
| | nano silver paste | 50 | 70 | 80 | 60 |
| Resistivity ($\Omega \cdot m$) | | $1.63 \times 10^{-6}$ | $1.98 \times 10^{-6}$ | $1.44 \times 10^{-6}$ | $2.05 \times 10^{-6}$ |

The nano silver paste of Example 1-5 was mixed with an ink solvent and subjected to ultrasonic dispersion for 6 min to prepare a conductive ink. The conductive ink was spin-coated on the photographic paper substrate to measure the resistivity. The composition and resistivity (after cured) of the conductive ink were shown in Table 3.

TABLE 3

Composition and resistivity of conductive inks

| | Example | Example 1-10 | Example 1-11 | Example 1-12 | Example 1-13 |
|---|---|---|---|---|---|
| Composition (parts by weight) | glycol | 30 | 50 | 40 | 35 |
| | nano silver paste | 70 | 50 | 60 | 65 |
| Resistivity ($\Omega \cdot m$) | | $4.1 \times 10^{-8}$ | $6.93 \times 10^{-8}$ | $9.1 \times 10^{-8}$ | $3.7 \times 10^{-8}$ |

Example 2 Nano Gold Paste, Conductive Paste and Conductive Ink

The nano gold paste was prepared as follows.

(S1) An organic metallic salt and an organ reducing agent were added into a solvent.

(S2) The reaction was carried out under heating to obtain a mixture containing metal nanoparticles.

(S3) The mixture was concentrated to obtain the nano metal paste.

The raw materials, the preparation parameters, and the weight percentage of gold nanoparticles in the nano gold pastes were shown in Table 4.

TABLE 4

Raw materials, preparation parameters and weight percentage of gold nanoparticles in Example 2

| Raw material & parameter | Example 2-1 | Example 2-2 | Example 2-3 |
|---|---|---|---|
| Organic metallic salts | gold acetate | gold acetate | gold acetylacetonate |
| Organic reducing agent | ascorbic acid | pyrocatechol | aniline |
| Solvent | ethanol | diglycol | terpineol |
| Reaction temperature | 30° C. | 40° C. | 100° C. |
| Reaction time | 30 min | 60 min | 5 min |
| Centrifugation rotation speed | 9000 rpm | 12000 rpm | 8000 rpm |
| Centrifugation time | 4 min | 1 min | 10 min |
| Weight percentage of gold nanoparticles | 88% | 93% | 85% |

The nano gold paste of Example 2-1 was mixed with a resin and a curing agent uniformly to prepare a conductive paste. The conductive paste was applied between two glass sheets and cured to test the resistivity. The composition and resistivity (after cured) of the conductive pastes were shown in Table 5.

TABLE 5

Composition and resistivity of conductive pastes

| | Raw material | Example 2-4 | Example 2-5 | Example 2-6 | Example 2-7 |
|---|---|---|---|---|---|
| Composition (parts by weight) | bisphenol F epoxy resin | 40 | 40 | 28 | 35 |
| | polyamide | 4 | 3 | 2 | 5 |
| | nano gold paste | 50 | 55 | 70 | 65 |
| Resistivity ($\Omega \cdot m$) | | $2.45 \times 10^{-6}$ | $2.37 \times 10^{-6}$ | $4.77 \times 10^{-6}$ | $0.99 \times 10^{-6}$ |

Example 3 Nano Nickel Paste, Conductive Paste, Conductive Paste and Conductive Ink The nano nickel paste was prepared as follows.

(S1) An organic metallic salt and an organic reducing agent were added into a solvent.

(S2) The reaction was carried out under heating to obtain a mixture containing metal nanoparticles.

(S3) The mixture was concentrated to obtain the nano metal paste.

The raw materials, the preparation parameters, and the weight percentage of nickel nanoparticles in the nano nickel pastes were shown in Table 6.

TABLE 6

Raw materials, preparation parameters and weight percentage of nickel nanoparticles in Example 3

| Raw material & parameter | Example 3-1 | Example 3-2 | Example 3-3 | Example 3-4 | Example 3-5 |
| --- | --- | --- | --- | --- | --- |
| organic metallic salts | nickel formate | nickel acetylacetonate | nickel benzoate & nickel stearate | nickel acetate | nickel formate |
| Organic reducing agent | hydrazine hydrate | glucose | pyrocatechol | ascorbic acid | Acetaldehyde & aniline |
| Solvent | terpineol | ethanol & glycol | diglycol | dipropylene glycol | DI water |
| Reaction temperature | 40° C. | 40° C. | 100° C. | 40° C. | 60° C. |
| Reaction time | 15 min | 20 min | 3 min | 20 min | 10 min |
| Centrifugation rotation speed | 10000 rpm | 12000 rpm | 3000 rpm | 10000 rpm | 15000 rpm |
| Centrifugation time | 3 min | 1 min | 1 min | 3 min | 1 min |
| Weight percentage of nickel nanoparticles | 90% | 89% | 20% | 87% | 95% |

60 parts by weight of the nano nickel paste of Example 3-1 was mixed with 40 parts by weight of the styrene acrylic resin and 4 parts by weight of a curing agent (aromatic acid anhydride) uniformly to prepare a conductive paste. The conductive paste was applied between two glass sheets and cured to test the resistivity, and the resistivity was measured as $7.16 \times 10^{-6}$ Ω·m.

55 parts by weight of the nano nickel paste of Example 3-4 was mixed with 30 parts by weight of DI water uniformly and ultrasonic dispersion for 6 min to prepare a conductive ink. The conductive ink was spun onto the photographic paper substrate for printing to test the resistivity, and the resistivity was measured as $1.81 \times 10^{-7}$ Ω·m.

Example 4 Nano Palladium Paste, Conductive Paste and Conductive Ink

The nano palladium paste was prepared as follows.

(S1) An organic metallic salt and an organic reducing agent were added into a solvent.

(S2) The reaction was carried out under heating to obtain a mixture containing metal nanoparticles.

(S3) The mixture was concentrated to obtain the nano metal paste.

The raw materials, the preparation parameters, and the weight percentage of palladium nanoparticles in the nano palladium pastes were shown in Table 7.

TABLE 7

Raw materials, preparation parameters and weight percentage of palladium nanoparticles in Example 4

| Raw material & parameter | Example 4-1 | Example 4-2 | Example 4-3 | Example 4-4 | Example 4-5 |
|---|---|---|---|---|---|
| Organic metallic salts | palladium acetylacetonate | palladium formate | palladium benzoate | palladium acetate | palladium formate & palladium acetate |
| Organic reducing agent | ascorbic acid | glucose & hydrazine hydrate | pyrocatechol | aniline | acetaldehyde |
| Solvent | DI water | ethanol & glycol | diglycol | dipropylene glycol | terpineol |
| Reaction temperature | 35° C. | 60° C. | 100° C. | 150° C. | 80° C. |
| Reaction time | 40 min | 30 min | 10 min | 1 min | 20 min |
| Centrifugation rotation speed | 12000 rpm | 12000 rpm | 3000 rpm | 6000 rpm | 15,000 rpm |
| Centrifugation time | 2 min | 1 min | 1 min | 2 min | 1 min |
| Weight percentage of palladium nanoparticles | 87% | 82% | 35% | 62% | 95% |

60 parts by weight of the nano palladium paste of Example 4-1 was mixed with 30 parts by weight of the alicyclic epoxy resin and 30 parts by weight of a curing agent (polyamide) uniformly to prepare a conductive paste. The conductive paste was applied between two glass sheets and cured to test the resistivity, and the resistivity was measured as $1.07 \times 10^{-6}$ Ω·m.

Example 5 Nano Tungsten Paste, Conductive Paste and Conductive Ink

The nano tungsten paste was prepared as follows.
(S1) An organic metallic salt and an organic reducing agent were added into a solvent.
(S2) The reaction was carried out under heating to obtain a mixture containing metal nanoparticles.
(S3) The mixture was concentrated to obtain the nano metal paste.

The raw materials, the preparation parameters, and the weight percentage of tungsten nanoparticles in the nano tungsten pastes were shown in Table 8.

TABLE 8

Raw materials, preparation parameters and weight percentage of tungsten nanoparticles in Example 5

| Raw material & parameter | Example 5-1 | Example 5-2 |
|---|---|---|
| Organic metallic salts | Tungsten acetate | Tungsten acetylacetonate |
| Organic reducing agent | glucose | glucose & hydrazine hydrate |
| Solvent | DI water | Ethanol & glycol |
| Reaction temperature | 20° C. | 60° C. |
| Reaction time | 20 min | 15 min |
| Centrifugation rotation speed | 10000 rpm | 12000 rpm |
| Centrifugation time | 3 min | 1 min |
| Weight percentage of tungsten nanoparticles | 88% | 83% |

60 parts by weight of the nano tungsten paste of Example 5-1 was mixed with 30 parts by weight of the bisphenol A epoxy resin and 3 parts by weight of a curing agent (polyamide) uniformly to prepare a conductive paste. The conductive paste was applied between two glass sheets and cured to test the resistivity, and the resistivity was measured as $5.42 \times 10^{-6}$ Ω·m.

Example 6 Nano Cobalt Paste, Conductive Paste and Conductive Ink

The nano cobalt paste was prepared as follows.
(S1) An organic metallic salt and an organic reducing agent were added into a solvent.
(S2) The reaction was carried out under heating to obtain a mixture containing metal nanoparticles.
(S3) The mixture was concentrated to obtain the nano metal paste.

The raw materials, the preparation parameters, and the weight percentage of cobalt nanoparticles in the nano cobalt pastes were shown in Table 9.

TABLE 9

Raw materials, preparation parameters and weight percentage of cobalt nanoparticles in Example 6

| Raw material & parameter | Example 6-1 | Example 6-2 | Example 6-3 | Example 6-4 | Example 6-5 |
|---|---|---|---|---|---|
| Organic metallic salts | cobalt acetate | cobalt formate | cobalt stearate | cobalt benzoate & cobalt stearate | cobalt acetylacetonate |

TABLE 9-continued

Raw materials, preparation parameters and weight percentage of cobalt nanoparticles in Example 6

| Raw material & parameter | Example 6-1 | Example 6-2 | Example 6-3 | Example 6-4 | Example 6-5 |
|---|---|---|---|---|---|
| Organic reducing agent | ascorbic acid | pyrocatechol | hydrazine hydrate | aniline | ascorbic acid |
| Solvent | DI water | ethanol & glycol | diglycol | dipropylene glycol | DI water |
| Reaction temperature | 20° C. | 30° C. | 100° C. | 180° C. | 60° C. |
| Reaction time | 60 min | 40 min | 20 min | 1 min | 25 min |
| Centrifugation rotation speed | 10000 rpm | 12000 rpm | 3000 rpm | 6000 rpm | 15000 rpm |
| Centrifugation time | 3 min | 1 min | 5 min | 2 min | 1 min |
| Weight percentage of cobalt nanoparticles | 90% | 91% | 70% | 73% | 92% |

60 parts by weight of the nano cobalt paste of Example 6-1 was mixed with 30 parts by weight of the bisphenol A epoxy resin and 30 parts by weight of a curing agent (polyamide) uniformly to prepare a conductive paste. The conductive paste was applied between two glass sheets and cured to test the resistivity, and the resistivity was measured as $6.37 \times 10^{-6}$ Ω·m.

Example 7 Nano Platinum Paste, Conductive Paste and Conductive Ink

The nano platinum paste was prepared as follows.
(S1) An organic metallic salt and an organic reducing agent were added into a solvent.
(S2) The reaction was carried out under heating to obtain a mixture containing metal nanoparticles.
(S3) The mixture was concentrated to obtain the nano metal paste.

The raw materials, the preparation parameters, and the weight percentage of platinum nanoparticles in the nano platinum pastes were shown in Table 10.

TABLE 10

Raw materials, preparation parameters and weight percentage of platinum nanoparticles in Example 7

| Raw material & parameter | Example 7-1 | Example 7-2 | Example 7-3 | Example 7-4 |
|---|---|---|---|---|
| organic metallic salts | platinum acetate | platinum acetylacetonate | platinum benzoate | platinum stearate |
| Organic reducing agent | ascorbic acid | glucose & hydrazine hydrate | pyrocatechol | aniline |
| Solvent | glycol | terpineol | diglycol | dipropylene glycol |
| Reaction temperature | 20° C. | 40° C. | 100° C. | 180° C. |
| Reaction time | 60 min | 50 min | 30 min | 1 min |
| Centrifugation rotation speed | 10000 rpm | 12000 rpm | 8000 rpm | 10000 rpm |
| Centrifugation time | 3 min | 1 min | 10 min | 2 min |
| Weight percentage of platinum nanoparticles | 87% | 93% | 85% | 92% |

60 parts by weight of the nano cobalt paste of Example 7-1 was mixed with 30 parts by weight of the bisphenol F epoxy resin and 30 parts by weight of a curing agent (polyamide) uniformly to prepare a conductive paste. The conductive paste was applied between two glass sheets and cured to test the resistivity, and the resistivity was tested as $2.2 \times 10^{-5}$ Ω·m.

Comparative Example 1

This comparative example provides a method for preparing silver nanoparticles and a method for preparing conductive ink by using the silver nanoparticles. The silver nanoparticles were prepared as follows.

(S1) By liquid phase reduction method, 0.1 mol of silver nitrate is dissolved in ultrapure water to obtain a silver nitrate solution, and 0.25 mol of sodium borohydride is dissolved in ultrapure water to obtain a reduction solution.

(S2) The reducing regent was added to the silver nitrate solution to obtain a nano silver solution, and the nano silver solution was reacted at 40° C. for 60 min.

(S3) The nano silver solution after reacted was centrifuged at 7000 rpm for 10 min and washed with ultrapure water, and then centrifugation and wash were continued and repeated three times for purifying to obtain the silver nanoparticles.

(S4) The silver nanoparticles were dried in a vacuum oven at 60° C. for 6 h. After the drying was completed, the silver nanoparticles were removed for grinding.

(S5) The silver nanoparticles were dispersed into diethylene glycol to obtain a nano silver suspension.

(S6) The nano silver suspension was then put into an ultrasonic oscillator for re-dispersion to obtain a nano silver conductive ink, and the resistivity was measured as $6.8 \times 10^{-8}$ Ω·m.

In the silver nanoparticle preparation of the comparative example, anions and boric acid and other products are difficult to remove directly from the nano silver suspension. The silver nanoparticles suitable for use in conductive inks need to be prepared after several centrifugation, purification and other steps. Referring to example 1, in the integrated preparation of nano silver paste, the silver formate and ascorbic acid were directly reacted to prepare a nano silver paste without further purification, drying and other steps, and can be configured into a conductive ink by directly adding a solvent.

Other ingredients in the nano metal paste and other operations in the preparation according to an embodiment of the present disclosure are known to those skilled in the art, and will not be described in detail herein.

The description with reference to the terms "embodiment", "example", etc. is intended to mean that a specific feature, structure, material, or characteristic described in conjunction with the embodiment or example is included in at least one embodiment or example of the present disclosure. Moreover, illustrative expressions involving the above terms do not necessarily refer to the same embodiment or example. Moreover, the described features, structures, materials, or characteristics may be combined in any one or more embodiments or examples in a suitable manner.

Although the present disclosure has been described in detail above with reference to the embodiments, those skilled in the art can still make various changes, modifications, substitutions and variations. It should be understood that those made without departing from the spirit of the disclosure shall still fall within the scope of the present disclosure defined by the appended claims.

What is claimed is:

1. A method for preparing a nano metal paste, comprising:
   (S1) adding an organic metallic salt and an organic reducing agent to a solvent to obtain a first mixture, wherein the solvent is water, an organic solvent or a combination thereof;
   (S2) reacting the first mixture under heating to obtain a second mixture containing metal nanoparticles; and
   (S3) concentrating the second mixture to obtain the nano metal paste without drying, grinding, and separating steps, wherein a weight percentage of the metal nanoparticles in the nano metal paste is 20-95%; and
   wherein the organic reducing agent is selected from the group consisting of pyrocatechin, aniline, and a combination thereof;
   in the step (S2), the metal nanoparticles are selected from the group consisting of silver nanoparticles, gold nanoparticles, nickel nanoparticles, palladium nanoparticles, tungsten nanoparticles, cobalt nanoparticles and platinum nanoparticles; and
   when the metal nanoparticles are silver nanoparticles, the organic metallic salt is selected from the group consisting of silver formate, silver stearate, and a combination thereof.

2. The method of claim 1, wherein in the step (S2), the first mixture is reacted at 20-180° C. for 1-60 min.

3. The method of claim 1, wherein in the step (S3), the second mixture is concentrated by centrifugation at 3,000-15,000 rpm for 1-10 min.

4. The method of claim 1, wherein in the step (S1), the solvent is selected from the group consisting of deionized water, ethanol, ethylene glycol, diglycol, dipropylene glycol (DPG), glycerine, terpilenol, and a combination thereof.

5. The method of claim 1, wherein when the metal nanoparticles are gold nanoparticles, the organic metallic salt is selected from the group consisting of gold acetate, gold acetylacetonate and a combination thereof;
   when the metal nanoparticles are nickel nanoparticles, the organic metallic salt is selected from the group consisting of nickel formate, nickel acetate, nickel acetylacetonate, nickel benzoate, nickel stearate and a combination thereof;
   when the metal nanoparticles are palladium nanoparticles, the organic metallic salt is selected from the group consisting of palladium formate, palladium acetylacetonate, palladium benzoate, palladium acetate and a combination thereof;
   when the metal nanoparticles are tungsten nanoparticles, the organic metallic salt is selected from the group consisting of tungsten acetate, tungsten acetylacetonate and a combination thereof;
   when the metal nanoparticles are cobalt nanoparticles, the organic metallic salt is selected from the group consisting of cobalt formate, cobalt acetate, cobalt acetylacetonate, cobalt benzoate, cobalt stearate and a combination thereof; and
   when the metal nanoparticles are platinum nanoparticles, the organic metallic salt is selected from the group consisting of platinum acetate, platinum acetylacetonate, platinum benzoate, platinum stearate and a combination thereof.

6. A method for preparing a conductive paste, comprising:
   (S1) preparing a nano metal paste by using the method of claim 1; and
   (S2) mixing the nano metal paste with a resin and a curing agent uniformly to obtain the conductive paste;
   wherein the nano metal paste accounts for 50-80% of a total weight of the conductive paste.

7. A method for preparing a conductive ink, comprising:
   (S1) preparing a nano metal paste by using the method of claim 1; and
   (S2) mixing the nano metal paste with an ink solvent uniformly to obtain the conductive ink;
   wherein the nano metal paste accounts for 50-70% of a total weight of the conductive ink.

* * * * *